US007823170B2

(12) United States Patent
Jolfaei et al.

(10) Patent No.: US 7,823,170 B2
(45) Date of Patent: Oct. 26, 2010

(54) QUEUED ASYNCHRONOUS REMOTE FUNCTION CALL DEPENDENCY MANAGEMENT

(75) Inventors: Masoud Aghadavoodi Jolfaei, Wiesloch (DE); Wolfgang Baur, Karlsruhe (DE); Kai Baumgarten, Rauenberg (DE); Thomas C. Becker, Mannheim (DE); Andreas Blumenthal, Heidelberg (DE); Rolf Hammer, Karlsruhe (DE); Wolfgang G. Mueller, Wiesloch (DE); Helmut Prestel, Bad Schoenborn (DE); Werner Rehm, Heidelberg (DE); Wolfgang Roeder, Nussloch (DE); Carl Philipp Staszkiewicz, Speyer (DE); Volker Wiechers, Heidelberg (DE); Guenter Zachmann, Rauenberg (DE)

(73) Assignee: SAP AG, Walldorf (DE)

( * ) Notice: Subject to any disclaimer, the term of this patent is extended or adjusted under 35 U.S.C. 154(b) by 1259 days.

(21) Appl. No.: 11/218,344

(22) Filed: Aug. 31, 2005

(65) Prior Publication Data

US 2007/0074150 A1     Mar. 29, 2007

(51) Int. Cl.
*G06F 9/46* (2006.01)
*G06F 9/44* (2006.01)

(52) U.S. Cl. .................. 719/330; 717/155; 717/157; 718/103; 718/104; 718/106; 719/314

(58) Field of Classification Search ................ None
See application file for complete search history.

(56) References Cited

U.S. PATENT DOCUMENTS

| 5,408,663 | A | * | 4/1995 | Miller | 718/104 |
| 5,737,498 | A | * | 4/1998 | Murray | 700/246 |
| 6,425,017 | B1 | * | 7/2002 | Dievendorff et al. | 719/315 |
| 6,910,053 | B1 | * | 6/2005 | Pauly et al. | 707/203 |
| 2006/0101062 | A1 | * | 5/2006 | Godman et al. | 707/102 |
| 2006/0212869 | A1 | * | 9/2006 | Bril et al. | 718/102 |

OTHER PUBLICATIONS

Baur, W. et al., "Increase the efficiency of your RFC communications withbgRFC—a scalable and transactional middleware framework", *SAP Professional Journal*, May/Jun. 2007, vol. 9, Issue 3, pp. 77-106.
SAP AG, "CD201 ABAP Connectivity Overview", Slides for 1 hour presentation given at TechEd in Las Vegas, NV, USA and Munich, Germany at SAP TechED '07, Oct. 2007, 41 pages.
SAP AG, "CD351 ABAP RFC Programming Revisited", Slides for 4 hour workshop given at TechEd in Las Vegas, NV, USA and Munich, Germany at SAP TechED '07, Oct. 2007, 49 pages.

\* cited by examiner

*Primary Examiner*—Michael J Yigdall
(74) *Attorney, Agent, or Firm*—Fish & Richardson P.C.

(57) ABSTRACT

A system, computer program product and method of processing function calls in a distributed application environment are provided. A number of function calls for communication from a sending application to a receiving application are queued in a database. Dependencies among at least a portion of the function calls that are being queued are determined while the function calls are stored in the queues. A schedule of execution of the function calls is then generated based on the determined dependencies.

20 Claims, 7 Drawing Sheets

QUEUED ASYNCHRONOUS REMOTE FUNCTION CALL DEPENDENCY MANAGEMENT

BACKGROUND

Applications of all types often rely on communication with other applications to perform their job. The communication includes requests by one application for functions and services from another, and can occur within a system or between different and/or remote systems. One example of a system is R/3 a set of integrated business applications from SAP AG of Walldorf, Germany. R/3 uses the client/server model and provides the ability to store, retrieve, analyze, and process business data for financial analysis, production operation, human resource management, and other business processes.

Whether communication is conducted within one system or among different systems, an interface protocol is needed to manage each communication. One type of such interface is called a remote function call (RFC). The term RFC also refers to an SAP interface protocol based on CPI-C that is used to simplify the programming of communication processes between applications. For example, RFCs are used by an R/3 application to call other applications and instigate them to perform a particular task. As used herein, the term RFC relates generally to a communication interface protocol to manage data transfer between a source system and a target system. RFCs also manage the communication process, parameter transfer and error handling between a sending application and a receiving application. For different operating systems, an RFC library is available as an application programming interface (API).

An early version of an RFC, called synchronous RFC (sRFC), required both participating applications to communicate synchronously, which limited their use. Subsequent generations of RFC have provided a considerably extended range of functions, such as, for example, serialization, which guarantees that processing occurs once, and the target system does not have to be available. The range of functions was further extended by introduction of a queued RFC (qRFC) that uses outbound and/or inbound queues to collect RFC data to guarantee processing occurs exactly once and in a particular order. The qRFC enables parallelization of application tasks.

A function module is a modular component of a computer software program. The RFC is the communication protocol used to serialize the call at the sender, to transfer the call, and deserialize the call at the receiver. The qRFCs enable alignment or parallelization of calls at the sender, i.e. the originator/caller. The aligned calls are also known as an LUW, or simply "unit of work." The transactional RFC protocol guarantees that the calls of one LUW are transferred indivisibly, and the qRFCs additionally guarantee that the sequence for transfer is the same as at calling time.

The function modules are a special class of application program subroutines, and form the basis of a componentized application system. In the calling interface of a function module, import, changing, export and table parameters are defined. A changed parameter value is assessed after execution of the function and the results returned. The syntax for calling function modules is shown in FIG. 1. Function modules allow for the reuse of routines, and include a clearly defined calling interface, while the data objects of the calling application and of the functional module are located in separate work areas. Function modules can be called across system boundaries via RFC, and thus serve as the basis for distributed business applications.

Consider FIG. 2, in which a sending (or calling) application 104 (or client) in a source system 102 uses a first RFC connection 106 to communicate with a receiving (or target) application 114 (or server) in a target system 112. If the data being sent is not interrelated, a particular kind of RFC, a transactional RFC (tRFC), is used to transfer data. Using a tRFC, each function module sent to the target system 112 is guaranteed to be processed once. The order in which the function modules are executed, and the time they are executed, cannot be determined. If a transfer error occurs, a batch job is scheduled in the sending application 104 that resends the function module after a period of time.

If the data being sent is interrelated, and the function modules need to be executed exactly once in order (EOIO), an outbound queue 108 is provided in the source system 102, and may be used with an inbound queue 118 in the target system 112. The outbound queue 108 in the client system is needed to guarantee the sequence of processing, and to prevent individual applications from blocking all work processes in the source system 102. These queues require yet another particular type of RFC, the queued RFC (qRFC). Communication with a qRFC with inbound queue 118 and/or outbound queue 108 involves a three- or two -step processing and transfer model respectively. Each step is independent to ensure that asynchronous processing is as secure as possible. In the first step, business data from the sending application 104 is written to the outbound queue 108. After the business data is stored, in the second step a QOUT scheduler 110 transfers the business data from the source system 102 to the target system 112.

In the two-step process, used for communication between heterogeneous systems, the QOUT scheduler 110 reads the stored business data from the outbound queue 108 and performs the calculations. In this scenario, the source system 102 uses the outbound queue 108 to serialize the data being sent, such that dependent function modules (for example, "update" followed by "change") are placed in the outbound queue of the source system 102 and are guaranteed to be sent in the correct sequence, and only once, to the target system 112.

If the target system 112 is of a type that includes the inbound queue 118, the business data is transferred to the inbound queue 118. In the third step, a QIN scheduler 120 in the target system 112 activates processing of the business data in the inbound queue 118 in the target system 112. The QIN scheduler 120 is a local instance of a master scheduler (not shown). In this scenario, the QIN scheduler 120 reads all the business data, and calculates dependencies, i.e. shared resources of functions and/or services, between the sending application 104 and the receiving application 114 based on the business data. This guarantees that the sequence is preserved, and at the same time controls the resources in the source system 102 and in the target system 112. For example, the inbound queue 118 only processes as many function modules as the current resources in the target system 112 will allow, hence preventing a server being blocked by a client.

However, the dependencies between sender system and receiver system increasingly overwhelm one or both system's processing resources during runtime. Execution of a function or service is slowed when the scheduler must determine information about required resources for the function or service, and whether those resources are currently available. Further, load balancing of qRFCs is done based on logon groups, which had heretofore been a fairly accurate method of balancing work among schedulers. However, a dramatic increase in inter-application communication of client/server business applications has made logon-based load balancing ineffective.

The transactional behavior of the qRFC does not allow fundamental savings at the processing side of an individual unit, but the application of more or faster hardware is now directly perceivable with more throughput. The limiting factors of the qRFC are the performance of the database and the processing speed of the units. Further, the current qRFC protocol is limited in its resource allocation and management, i.e., calling applications can sometimes flood the system with calls.

SUMMARY

This document describes a system and method in which an application requests functions and services from another application using a queued data interface protocol. In one aspect, a system and method utilize a background RFC (bgRFC) interface by which data dependencies, e.g. shared resources, between sending application and receiving application are calculated at the time of storing the data in a queue. In doing so, the RFC scheduler can find all units that can be executed instantly with minimum effort, and all dependencies are detected only once. The additional effort when storing the data is compensated to a large extent by efficient algorithms and optimizations in the database design.

The bgRFC improves the runtime behavior exhibited by the qRFC. The improved interface protocol efficiently processes large amounts of data with high sequence-dependency. In one aspect, a computer program product and method of processing function calls in a distributed application environment is provided. A number of function calls for communication from a sending application to a receiving application are queued in a database. Dependencies among at least a portion of the function calls that are being queued are determined while the function calls are stored in the queues. A schedule of execution of the function calls is then generated based on the determined dependencies.

In another aspect, a system for processing function calls in a distributed application environment includes a calling system. The calling system includes a database having one or more outbound queues for storing function calls and associated data. The calling system further includes a scheduler that, while the function calls and associated data are being stored in the outbound queues, determines dependency information among the function calls and associated data. The scheduler is further configured to generate a schedule for execution of the stored function calls based on the dependency information. The calling system further includes a background remote function call interface via which functions associated with the stored function calls are transferred to a receiving application based on the schedule.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes system and methods in which an application can request functions and services from other applications using a messaging interface and protocol called a remote function call (RFC), and associated API. These systems and methods provide (a) scheduling of work load at the receiver (i.e. inbound scenario), (b) decoupling of work load, which is to be executed remotely according to scheduling by a calling application (i.e. outbound scenario), and (c) the combination of (a) and (b). These systems and methods improve runtime behavior of the qRFC, while minimizing resources required to perform qRFC administration and monitoring.

To improve qRFC performance, an improved data model of a background RFC (bgRFC) is introduced, where queues with dependencies are distinguished from independent queues, and dependencies between queued function calls and data are determined and recorded while the queues are being created. At creation time the information about sequence and dependencies is written with the LUW data.

To minimize resources used for function call administration and monitoring, explicit resource allocation for bgRFC administration and monitoring is enabled, and feedback about resource status at a receiving application is provided to the sending application. The scheduler gets a package of executable LUWs, and computing of sequence or dependency is not required.

Figure 1:
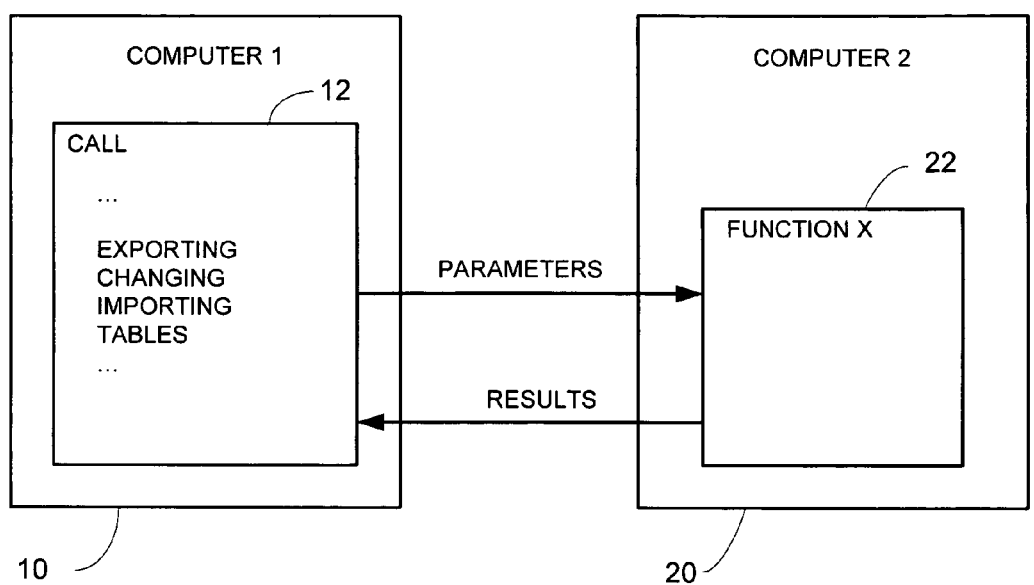
FIG. 1 is a block diagram illustrating a remote function call (RFC).
Figure 2:
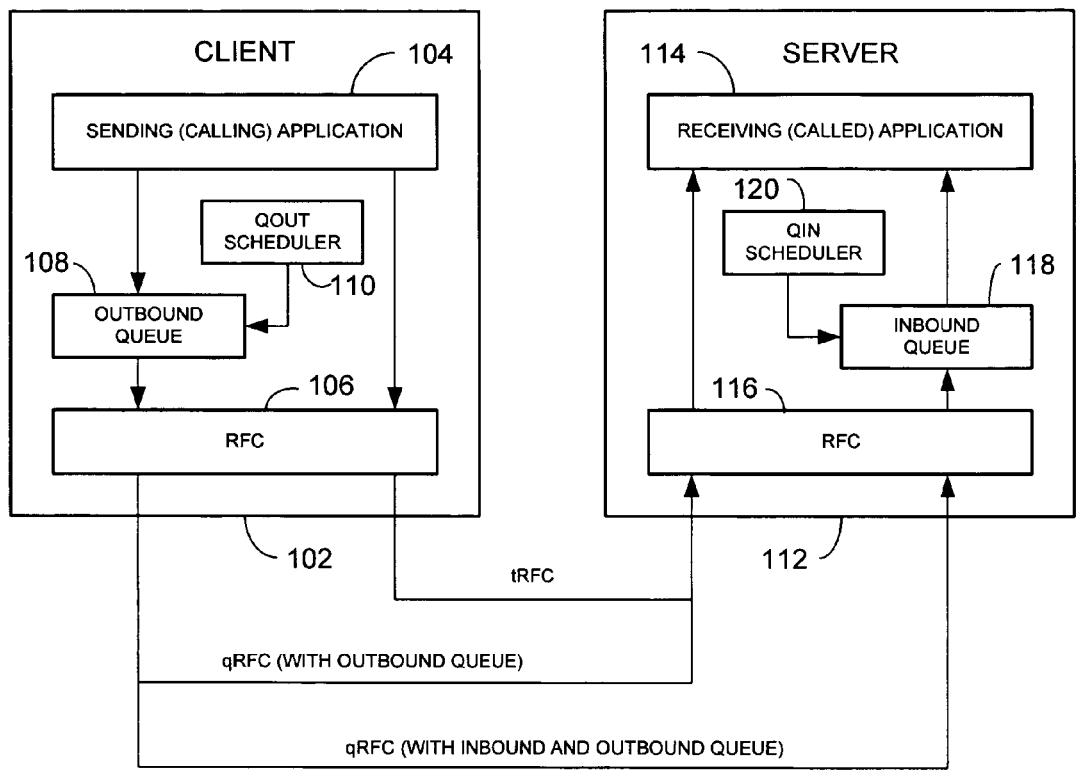
FIG. 2 is a block diagram of a distributed application environment.
Figure 3:
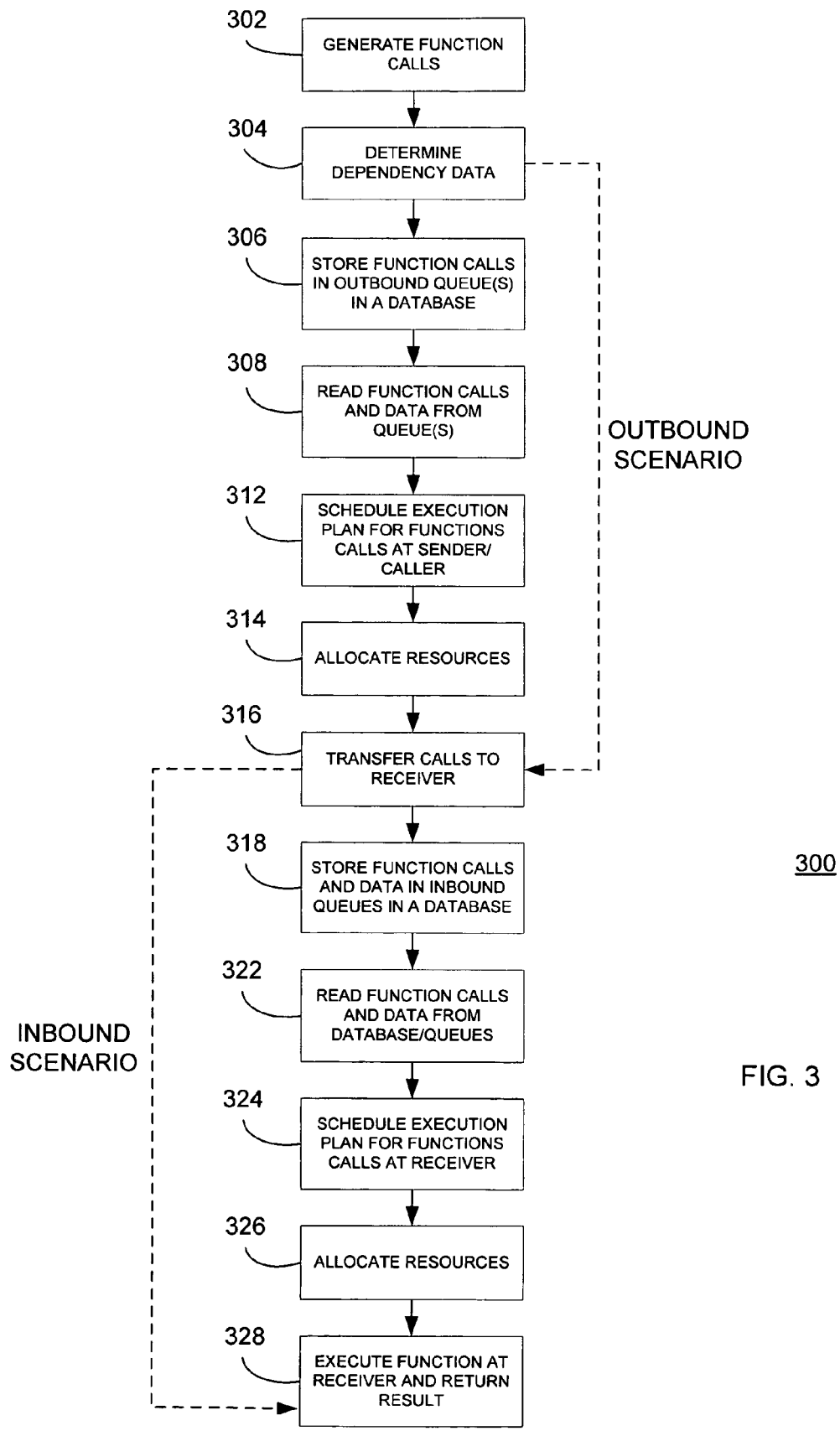
FIG. 3 illustrates a process of executing application operations in a distributed application environment.

FIG. 3 shows a process 300 of executing application operations in a distributed application environment. At 302, a sending application (i.e. client) of a calling system generates function calls for receipt and execution by a receiving application (i.e. a server or application server) of a called system. The function calls are generated and managed according to a remote function call interface protocol. At 304, dependency data, i.e. shared functions or services, is determined for the function calls and associated data. The dependency information is based on business need, i.e. where resource management becomes a requirement due to parallelization performed for better throughput. In accordance with various exemplary embodiments, an inbound scenario of the process 300 continues at 306, while an outbound scenario of the process 300 skips ahead.

At 306, the calling system stores function calls, and their associated data, in one or more outbound queues. The function calls and data are stored to ensure they are transferred to the receiving application for execution exactly once and in a particular order. At 308, the function calls and data are read from the queue(s). A scheduler reads function calls and data from the queues, also based at least in part on the dependency information and/or the schedule generated at 304. At 312, an execution plan for the function calls at the sender/caller is scheduled.

At 314, the sender/caller application allocates resources for executing the scheduled plan. The scheduler allocates resources required to execute the functions, i.e. instantiates a number of parallel scheduler instances to handle parallel function calls. At 316, the function calls are transferred to the receiving application via RFC communication. The bgRFC provides an API on top of the RFC protocol to enable the application to make use of additional service qualities, i.e. handshake, requesting an acknowledgement, etc., provided by the bgRFC, for example. The calls are transferred to a receiver/called application according to the scheduled plan. In accordance with exemplary embodiments, the inbound scenario skips ahead to 328, while the outbound scenario continues to 318.

At 318, the transferred function calls are stored, via receiving application bgRFC, in one or more inbound queues associated with an called system database. At 322, a scheduler reads function calls and data from the queues, also based at least in part on the dependency information and/or the schedule generated at 304. At 324, an execution plan for the function calls at the sender/caller is scheduled. At 326, the receiver/called application allocates resources for executing the scheduled plan. The scheduler allocates resources required to execute the functions, i.e. instantiates a number of parallel scheduler instances to handle parallel function calls. At 328, for both inbound and outbound scenarios, the function calls are executed by the receiver application, and a result is returned to the sender application.

For each client a number of outbound schedulers is started that share the work cooperatively. The schedulers are more sensitive to the load on the called systems. This information is updated in much shorter intervals. The maximum number of outbound schedulers that are allowed to run in parallel on an application server are adjusted, as are maximum number of connections that all schedulers together are allowed to use. This limitation prevents overstressing of the local gateway. By making the number of parallel outbound scheduler per source system and their maximum number of connections configurable, the gateways of the destinations are protected from overload.

Figure 4:
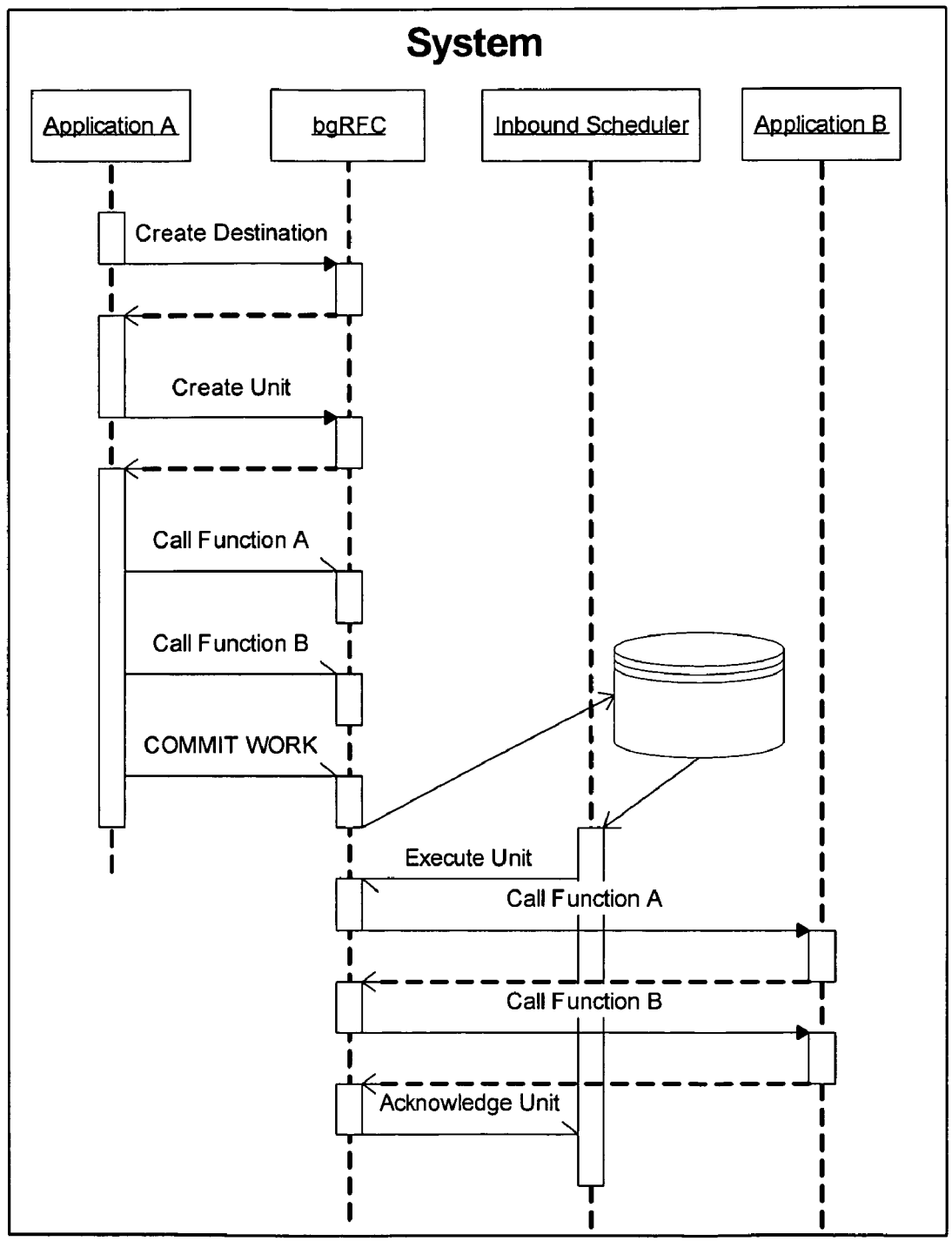
FIG. 4. is a communication diagram illustrating a bgRFC inbound scenario according to an exemplary use case.
Figure 5:
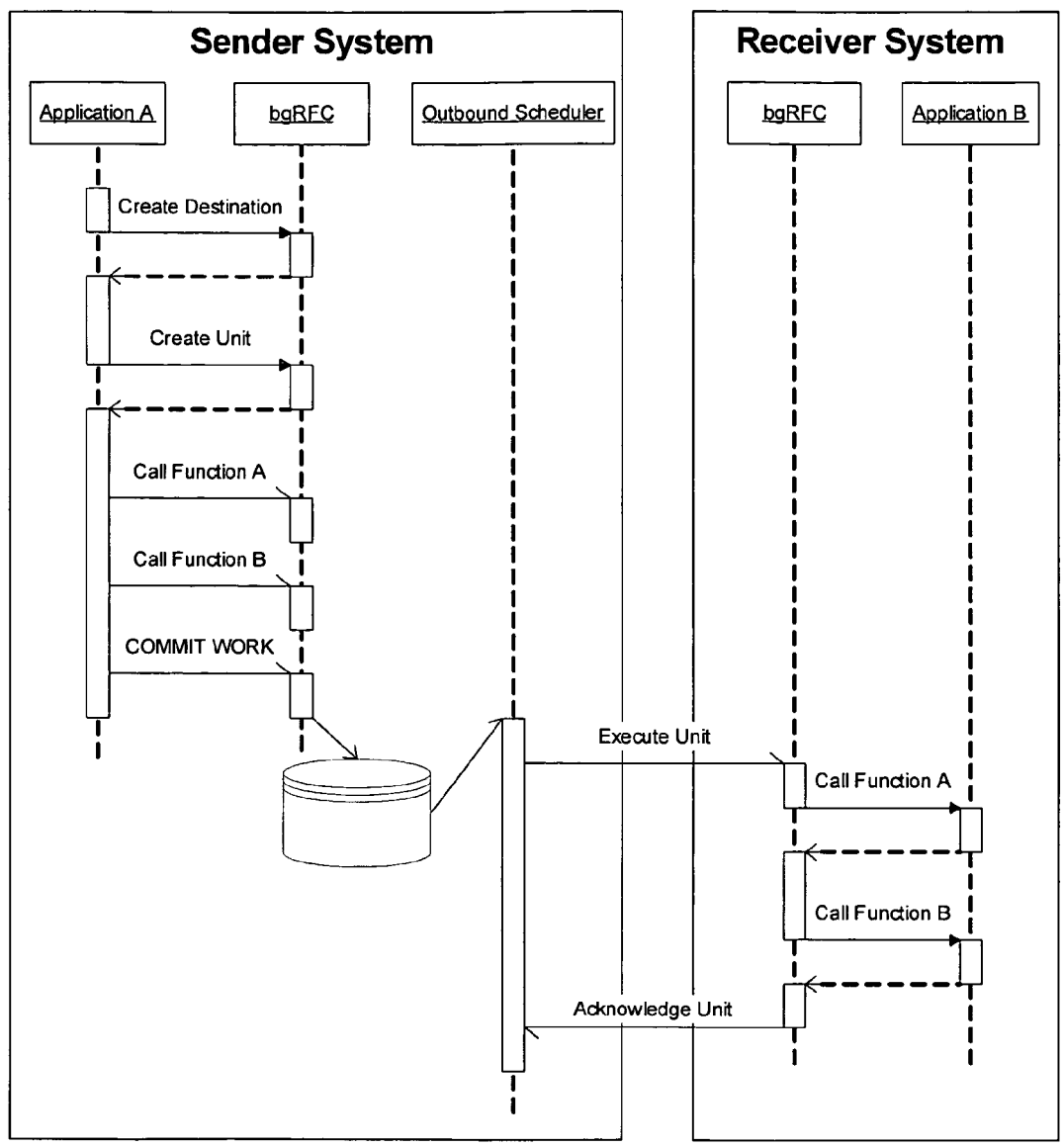
FIG. 5 is a communication diagram illustrating a bgRFC outbound scenario according to an exemplary use case.

FIG. 4 is a communication diagram illustrating a bgRFC inbound scenario according to an exemplary use case. The bgRFC inbound scenario provides asynchronous transactional processing of function calls in the same system, as well as intra-system communication. FIG. 5 is a communication diagram illustrating a bgRFC outbound scenario according to an exemplary use case. The bgRFC outbound scenario provides asynchronous transactional processing of functional calls in a remote system, where processing is controlled by a remote caller system.

Figure 6:
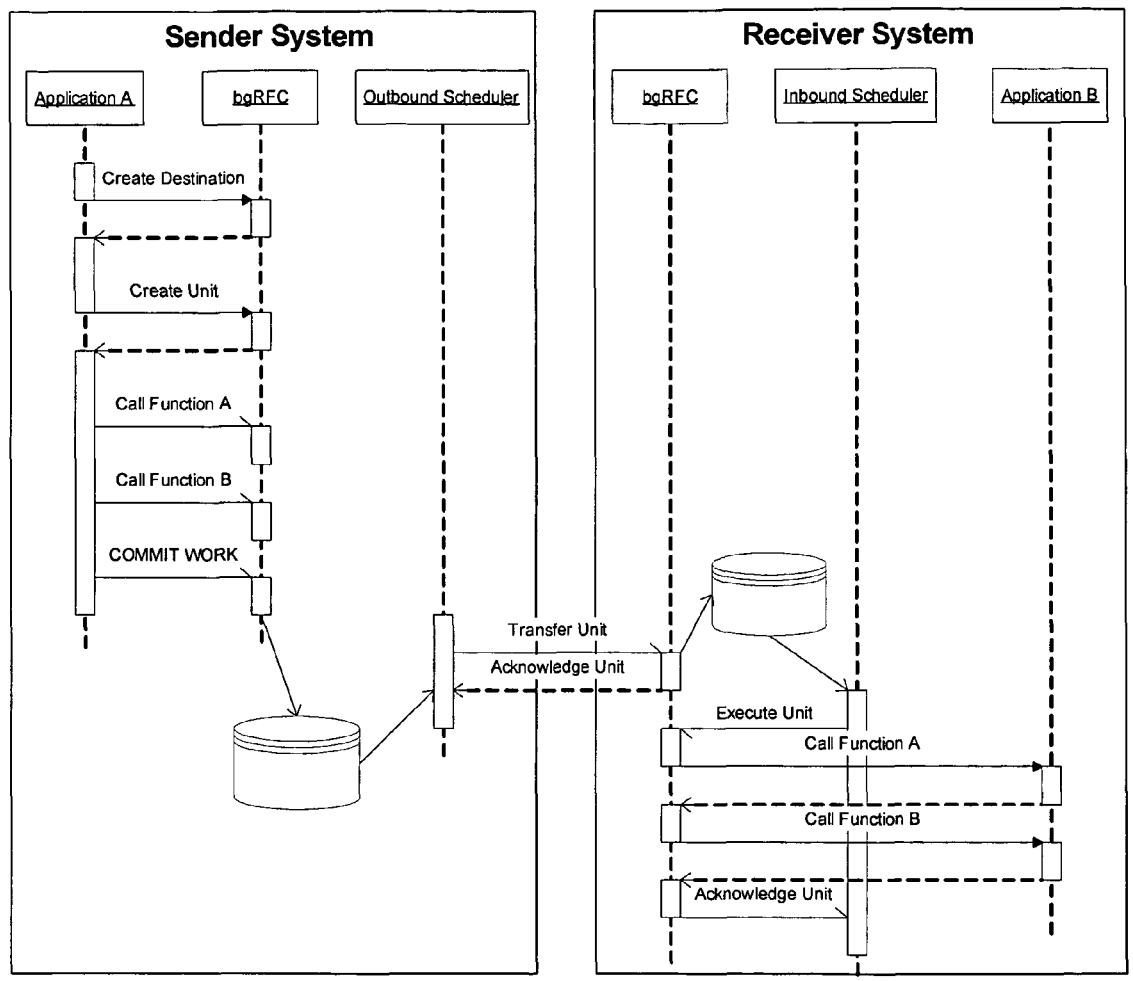
FIG. 6 is a communication diagram illustrating a bgRFC out-in scenario according to an exemplary use case.

FIG. 6 is a communication diagram illustrating a bgRFC outbound to inbound scenario according to another exemplary use case. The bgRFC outbound to inbound scenario provides asynchronous transactional processing of function calls in a remote system, where processing is controlled by the receiver system.

Figure 7:
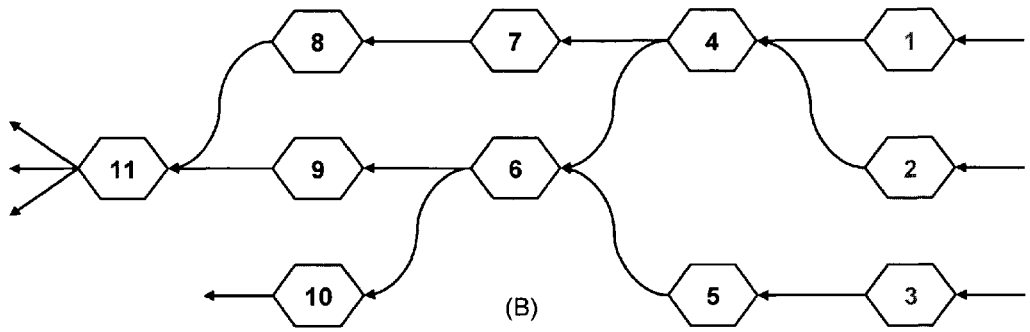
FIGS. 7A-C illustrates several example data models for units of work stored in one or more queues.

FIGS. 7A-C illustrates several example data models for LUWs stored in one or more queues. In the example, LUWs 1-10 are stored variously in queues A-C. LUW 11 is added in queue D, and also added in queue A and B to create a dependency. The resultant graph in FIG. 7B shows how the dependency of LUW 11 can be handled during processing. The same scenario of LUWs is illustrated in tables in FIG. 7C, where LUW 11 is added to two of the existing queues and a fourth queue D with only LUW 11. Note that additional LUWs will be added to queue D later.

Process 300 and the communication scenarios shown in FIGS. 4, 5, and 6, and their various modifications, are not limited to use with any particular hardware and/or software; they may find applicability in any computing or processing environment and with any type of machine that is capable of running machine-readable instructions. All or part of process 300 or the communication scenarios can be implemented in digital electronic circuitry, or in computer hardware, firmware, software, or in combinations thereof.

All or part of process 300 or the communication scenarios can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with process 300 can be performed by one or more programmable processors executing one or more computer programs to perform the functions of process 300. The method steps can also be performed by, and process 300 can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data.

Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of process 300 or the communication scenarios can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of process 300 or the communication scenarios, or any combination of such back-end, middleware, or front-end components. The components of the system can be interconnected by any form or medium of digital data communication, e.g., a communication network. Examples of communication networks include a LAN and a WAN, e.g., the Internet.

Method steps associated with process 300 can be rearranged and/or one or more such steps can be omitted to achieve the same, or similar, results to those described herein. Process 300 or the communication scenarios may be fully automated, meaning that it operate without user intervention, or interactive, meaning that all or part of process 300 or the communication scenarios may include some user intervention.

In addition to storing log files generated by applications, process 300 may also store log files generated by a wrapper service. A wrapper service is software that accompanies resources or other software for the purposes of improving convenience, compatibility, or security. These log files may be stored in the same manner as described above.

Elements of different embodiments described herein may be combined to form other embodiments not specifically set forth above. Other embodiments not specifically described herein are also within the scope of the following claims.

The invention claimed is:

1. A method of processing function calls in a distributed application environment, the method comprising:
   receiving a resource status of a receiver application at a sender application executed on a first computer;
   generating a plurality of function calls using the sender application, the plurality of function calls comprising a plurality of dependent function calls and a plurality of independent function calls;
   determining dependency data for the plurality of dependent function calls, the dependency data being based on the resource status;
   storing the plurality of dependent function calls and dependency data in a plurality of queues for execution using the receiver application at a second computer;
   storing the plurality of independent function calls in the plurality of queues, the plurality of function calls being stored for execution exactly once in a particular order based on the dependency data;
   generating an execution schedule for the plurality of function calls based on the dependency data; and
   executing each of the plurality of function calls at the second computer based on the execution schedule.

2. A method in accordance with claim 1, further comprising communicating data associated with the plurality of function calls from the sending application to the receiving application according to the execution schedule.

3. A method in accordance with claim 1, further comprising communicating, from the sending application to the receiving application, data associated with one or more functions executed by the receiving application.

4. A method in accordance with claim 1, further comprising reading data associated with the plurality of function calls from the one or more queues according to the execution schedule.

5. A method in accordance with claim 1, further comprising determining resources needed to execute the plurality of function calls based on the dependency data.

6. A method in accordance with claim 5, further comprising allocating the resources needed to execute the plurality of function calls.

7. A method in accordance with claim 1, further comprising instantiating a plurality of parallel scheduler instances to handle parallel function calls.

8. A method in accordance with claim 1, communicating a result to the sender application after executing each of the plurality of function calls at the receiver application.

9. A computer program product, tangibly embodied in a machine readable medium, comprising instructions operable to:
   receive a resource status of a receiver application at a sender application executed on a first computer;
   generate a plurality of function calls using the sender application, the plurality of function calls comprising a plurality of dependent function calls and a plurality of independent function calls;
   determine dependency data for the plurality of dependent function calls, the dependency data being based on the resource status;
   store the plurality of dependent function calls and dependency data in a plurality of queues for execution using the receiver application at a second computer;
   store the plurality of independent function calls in the plurality of queues, the plurality of function calls being stored for execution exactly once in a particular order based on the dependency data;
   generate an execution schedule for the plurality of function calls based on the dependency data; and
   execute each of the plurality of function calls at the second computer based on the execution schedule.

10. A computer program product in accordance with claim 9, further comprising instructions operable to communicate data associated with the stored plurality of function calls from the sending application to the receiving application according to the execution schedule.

11. A computer program product in accordance with claim 9, further comprising instructions operable to communicate, from the sending application to the receiving application, data associated with one or more functions executed by the receiving application.

12. A computer program product in accordance with claim 9, further comprising instructions operable to read, from the one or more queues according to the execution schedule, data associated with the plurality of function calls.

13. A computer program product in accordance with claim 9, further comprising instructions operable to determine resources needed to execute the plurality of function calls based on the dependency data.

14. A computer program product in accordance with claim 13, further comprising instructions operable to allocate the resources needed to execute the plurality of function calls.

15. A computer program product in accordance with claim 9, wherein the instructions further comprise instantiate a plurality of parallel scheduler instances to handle parallel function calls.

16. A computer program product in accordance with claim 9, wherein the instructions further comprise communicate a result to the sender application after executing each of the plurality of function calls at the receiver application.

17. A system for processing function calls in a distributed application environment, the system comprising:
   a first computer that is operable to execute a sender application;
   a second computer that is operable to execute a receiver application, and that is in communication with the sending computer;
   one or more processors executing one or more computer programs to perform instructions comprising:
      receive a resource status of a receiver application at a sender application;
      generate a plurality of function calls at the first computer, the plurality of function calls comprising a plurality of dependent function calls and a plurality of independent function calls;
      determine dependency data for the plurality of dependent function calls, the dependency data being based on the resource status;
      store the plurality of dependent function calls and dependency data in a plurality of queues for execution at the second computer;
      store the plurality of independent function calls in the plurality of queues, the plurality of function calls being stored for execution exactly once in a particular order based on the dependency data;
      generate an execution schedule for the plurality of function calls based on the dependency data; and
      execute each of the plurality of function calls at the second computer based on the execution schedule.

18. A system in accordance with claim 17, wherein the instructions further comprise communicate data associated with the plurality of function calls from the sending application to the receiving application according to the execution schedule.

19. A system in accordance with claim 17, wherein the instructions further comprise instantiate a plurality of parallel scheduler instances to handle parallel function calls.

20. A system in accordance with claim 17, wherein the instructions further comprise communicate a result to the sender application after executing each of the plurality of function calls at the receiver application.

* * * * *